(12) United States Patent
Kawata et al.

(10) Patent No.: US 12,546,866 B2
(45) Date of Patent: Feb. 10, 2026

(54) VEHICLE LAMP

(71) Applicant: Stanley Electric Co., Ltd., Tokyo (JP)

(72) Inventors: Tadashi Kawata, Tokyo (JP); Junpei Inmaru, Tokyo (JP); Jun Ando, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/845,369

(22) PCT Filed: Mar. 9, 2023

(86) PCT No.: PCT/JP2023/008950
§ 371 (c)(1),
(2) Date: Sep. 9, 2024

(87) PCT Pub. No.: WO2023/171732
PCT Pub. Date: Sep. 14, 2023

(65) Prior Publication Data
US 2025/0189634 A1    Jun. 12, 2025

(30) Foreign Application Priority Data

Mar. 11, 2022  (JP) ................. 2022-038209

(51) Int. Cl.
*G01S 7/00*         (2006.01)
*F21S 41/148*       (2018.01)
(Continued)

(52) U.S. Cl.
CPC ........... *G01S 7/4813* (2013.01); *F21S 41/148* (2018.01); *F21S 41/321* (2018.01); *G01S 7/4815* (2013.01);
(Continued)

(58) Field of Classification Search
CPC ...... G01S 7/4813; G01S 7/931; G01S 7/4815; G01S 7/4817; F21S 41/148; F21S 41/321; G02B 26/0833
See application file for complete search history.

(56) References Cited

U.S. PATENT DOCUMENTS

2017/0307736 A1\* 10/2017 Donovan ................. G01S 7/484
2019/0126808 A1\*  5/2019 Matsumoto ........... F21S 41/255
(Continued)

FOREIGN PATENT DOCUMENTS

EP         3812209 A1    4/2021
WO    2019/203177 A1   10/2019

OTHER PUBLICATIONS

International Search Report and Written Opinion for PCT/JP2023/008950 dated Apr. 18, 2023.

*Primary Examiner* — Gerald J Sufleta, II
(74) *Attorney, Agent, or Firm* — Kenealy Vaidya LLP

(57) ABSTRACT

A vehicle lamp can include: a first light source configured to emit visible light; a reflective surface designed to reflect the visible light emitted by the first light source and form a light distribution pattern for a vehicle lamp; and a LiDAR apparatus including a second light source configured to emit light for detecting an object to be detected to be transmitted to a first detection range and a light-receiving element configured to output, when return light being reflected light of the light for detecting the object to be detected having been reflected by the object to be detected is incident to the light-receiving element, an electric signal corresponding to an intensity of the return light, in which the LiDAR apparatus is arranged.

15 Claims, 11 Drawing Sheets

(51) Int. Cl.
*F21S 41/32* (2018.01)
*G01S 7/481* (2006.01)
*G01S 17/931* (2020.01)
*G02B 26/08* (2006.01)

(52) U.S. Cl.
CPC .......... *G01S 7/4817* (2013.01); *G01S 17/931* (2020.01); *G02B 26/0833* (2013.01)

(56) References Cited

U.S. PATENT DOCUMENTS

2022/0324372 A1* 10/2022 Brandstetter .......... G01S 17/42
2022/0338327 A1* 10/2022 Mochizuki .......... H05B 47/125

\* cited by examiner

VEHICLE LAMP

This application is a U.S. National Stage Application under 35 U.S.C § 371 of International Patent Application No. PCT/JP2023/008950 filed Mar. 9, 2023, which claims the benefit of priority under 35 U.S.C. § 119 to Japanese Patent Application No. 2022-038209 filed Mar. 11, 2022, the disclosures of all of which are hereby incorporated by reference in their entireties.

TECHNICAL FIELD

The present disclosure relates to a vehicle lamp and, in particular, to a vehicle lamp which does not require space for installing a reflector plate (reflective surface) that reflects light for detecting an object to be detected (for example, a preceding vehicle, an oncoming vehicle, a pedestrian, a bicycle, or a motorcycle) transmitted from a LiDAR apparatus (and return light thereof) and which can be downsized.

BACKGROUND ART

Patent Literature 1 describes a vehicle lamp including a LiDAR apparatus provided so as to be invisible from outside of the vehicle and a reflector plate (reflective surface) that reflects light for detecting an object to be detected (for example, a preceding vehicle, an oncoming vehicle, a pedestrian, a bicycle, or a motorcycle) transmitted from the LiDAR apparatus (and return light thereof).

CITATION LIST

Patent Literature

Patent Literature 1: International Patent Publication No. WO 2019/203177

SUMMARY OF INVENTION

Technical Problem

However, with the vehicle lamp described in Patent Literature 1, there is a problem in that a dedicated reflector plate (reflective surface) that reflects light for detecting an object to be detected (for example, a preceding vehicle, an oncoming vehicle, a pedestrian, a bicycle, or a motorcycle) transmitted from the LiDAR apparatus (and return light thereof) must be installed and, proportionally, the number of components increases and drives up cost. There is also a problem in that the need to secure an installation space for the dedicated reflector plate (reflective surface) makes it difficult to downsize the vehicle lamp.

The present disclosure has been made to solve such problems and an object thereof is to provide a vehicle lamp which does not require a dedicated reflector plate (reflective surface) that reflects light for detecting an object to be detected (for example, a preceding vehicle, an oncoming vehicle, a pedestrian, a bicycle, or a motorcycle) (and return light thereof) and an installation space thereof and which can be downsized.

Solution to Problem

A vehicle lamp according to the present disclosure includes: a first light source configured to emit visible light; a reflective surface designed to reflect the visible light emitted by the first light source and form a light distribution pattern for a vehicle lamp; and a LiDAR apparatus including a second light source configured to emit light for detecting an object to be detected to be transmitted to a first detection range and a light-receiving element configured to output, when return light being reflected light of the light for detecting the object to be detected having been reflected by the object to be detected is incident to the light-receiving element, an electric signal corresponding to an intensity of the return light, in which the LiDAR apparatus is arranged so that the light for detecting the object to be detected which is emitted by the second light source and which is reflected by the reflective surface is transmitted to a second detection range that is wider than the first detection range.

Such a configuration enables a vehicle lamp to be provided which does not require a dedicated reflector plate (reflective surface) for light for detecting an object to be detected (for example, a preceding vehicle, an oncoming vehicle, a pedestrian, a bicycle, or a motorcycle) transmitted from a LiDAR apparatus (and return light thereof) and an installation space thereof and which can be downsized.

This is due to the fact that instead of installing a dedicated reflector plate (reflective surface) for light for detecting an object to be detected transmitted from a LiDAR apparatus (and return light thereof) as in Patent Literature 1 described above, a reflective surface designed to form a light distribution pattern for a vehicle lamp is used as a reflective surface that reflects light for detecting an object to be detected transmitted from a LiDAR apparatus (and return light thereof).

In addition, since the LiDAR apparatus is arranged so that light for detecting the object to be detected which is emitted by the second light source and which is reflected by the reflective surface is transmitted to a second detection range that is wider than a first detection range (an original detection range of the LiDAR apparatus), the original detection range of the LiDAR apparatus can be expanded to the second detection range (in particular, expanded in a horizontal direction).

In the vehicle lamp described above, the LiDAR apparatus may include a MEMS mirror configured to reflect the light for detecting the object to be detected so that the first detection range is scanned by the light for detecting the object to be detected.

In the vehicle lamp described above, the reflective surface may be a reflective surface for a wide light distribution pattern designed to reflect visible light emitted by the first light source and form a wide light distribution pattern that is diffused in a horizontal direction.

In the vehicle lamp described above, the reflective surface may be designed so that a longitudinal cross-sectional shape of the reflective surface is a substantially parabolic surface and a focal point of the reflective surface is positioned in a vicinity of the first light source, and a lateral cross-sectional shape of the reflective surface causes visible light emitted by the first light source and reflected by the reflective surface to be diffused in the horizontal direction.

In the vehicle lamp described above, a radius of curvature of the lateral cross-sectional shape of the reflective surface may be greater than a radius of curvature of the longitudinal cross-sectional shape of the reflective surface.

In the vehicle lamp described above, the reflective surface may include a plurality of reflection regions formed by dividing the reflective surface, and each of the reflection regions may be designed as a convex surface or a concave surface so as to diffuse visible light emitted by the first light source and reflected by the reflection region in the horizontal direction and to form a light distribution pattern for the vehicle lamp.

In addition, the vehicle lamp described above may further include: a storage unit configured to store light source control data; and a light source control unit configured to control the second light source based on the light source control data so that the light for detecting the object to be detected is not transmitted in a specific angular direction, in which the specific angular direction may be an angular direction oriented toward a boundary portion between the reflection regions.

In the vehicle lamp described above, the LiDAR apparatus may be arranged in front of the reflective surface.

In the vehicle lamp described above, the LiDAR apparatus may be arranged behind the reflective surface.

In the vehicle lamp described above, a reflective member configured to reflect the light for detecting the object to be detected emitted by the second light source toward the reflective surface may be provided between the LiDAR apparatus and the reflective surface.

In the vehicle lamp described above, the reflective member may be a mirror or a prism.

In the vehicle lamp described above, the reflective member may be an elliptic reflective surface and light reflected by the elliptic reflective surface may cross (which refers to light reflected and collected by the elliptic reflective surface intersecting near a focal point installed between the elliptic reflective surface and the reflective surface and turning into diffused light; the light need not necessarily pass through the focal point and may only intersect) and head towards the reflective surface.

In addition, the vehicle lamp described above may further include: a signal processing unit configured to calculate a distance to an object to be detected based on an electric signal outputted by the light-receiving element and to output an angle of the object to be detected and the distance to the object to be detected; a storage unit configured to store correction data; and a correcting unit configured to correct the angle of the object to be detected outputted by the signal processing unit based on the correction data.

Advantageous Effects of Invention

According to the present disclosure, a vehicle lamp can be provided which does not require a dedicated reflector plate (reflective surface) for light for detecting an object to be detected (for example, a preceding vehicle, an oncoming vehicle, a pedestrian, a bicycle, or a motorcycle) (and return light thereof) and an installation space thereof and which can be downsized.

DESCRIPTION OF EMBODIMENTS

First Embodiment

Hereinafter, a vehicle lamp 10 according to a first embodiment of the present disclosure will be described with reference to the accompanying drawings. In the respective drawings, corresponding components will be denoted by the same reference signs and repetitive descriptions will be omitted.

Figure 1:
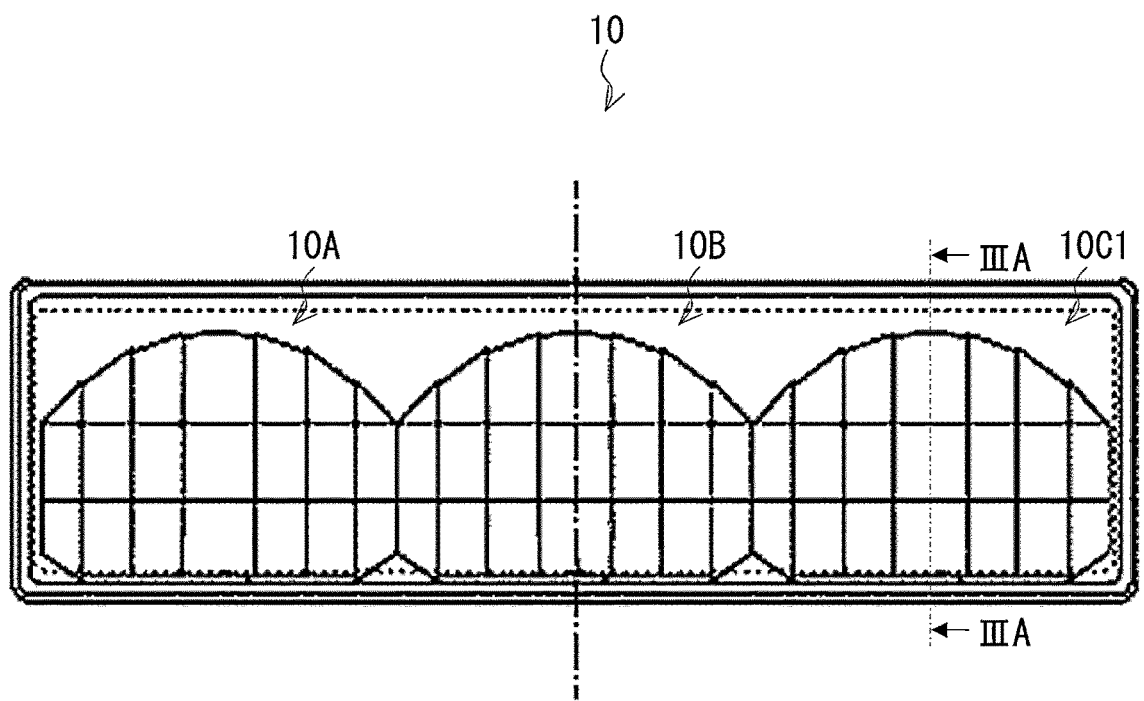
FIG. 1 is a front view of a vehicle lamp 10 according to a first embodiment.

FIG. 1 is a front view of the vehicle lamp 10 according to the first embodiment.

The vehicle lamp 10 according to the first embodiment is a head lamp with a built-in LiDAR (Light Detection And Ranging) apparatus which functions as a low-beam head lamp and which is mounted on both left and right sides of a front end part of a vehicle (not illustrated) such as an automobile. Since the vehicle lamp 10 mounted to the left side and the vehicle lamp 10 mounted to the right side are configured to be left-right symmetrical, hereinafter, the vehicle lamp 10 mounted to the left side of the front end part of the vehicle (the left side towards the front of the vehicle) will be described as a representative.

As shown in FIG. 1, the vehicle lamp 10 includes a lamp unit 10A for spot light distribution, a lamp unit 10B for middle light distribution, and a lamp unit 10C1 for wide light distribution.

Figure 2A:
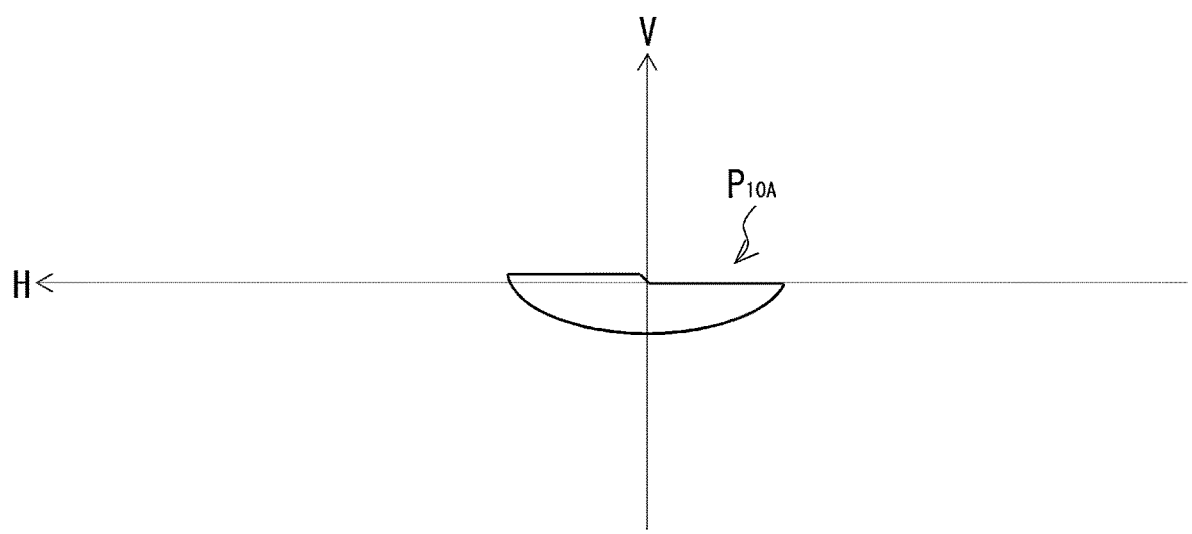
FIG. 2A shows an example of a spot light distribution pattern $P_{10A}$ formed by a lamp unit 10A for spot light distribution.
Figure 2B:
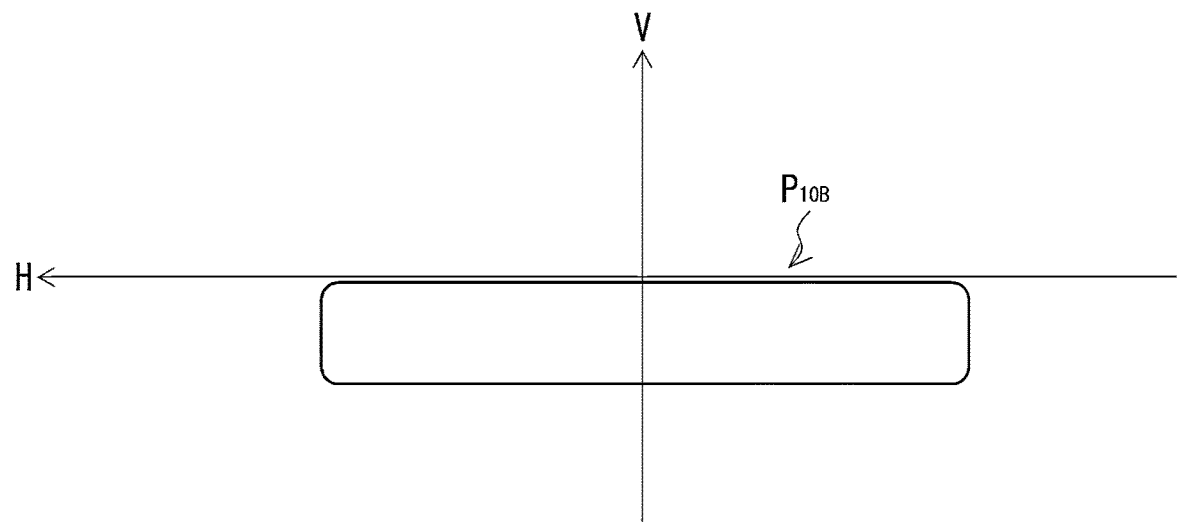
FIG. 2B shows an example of a middle light distribution pattern $P_{10B}$ formed by a lamp unit 10B for middle light distribution.
Figure 2C:
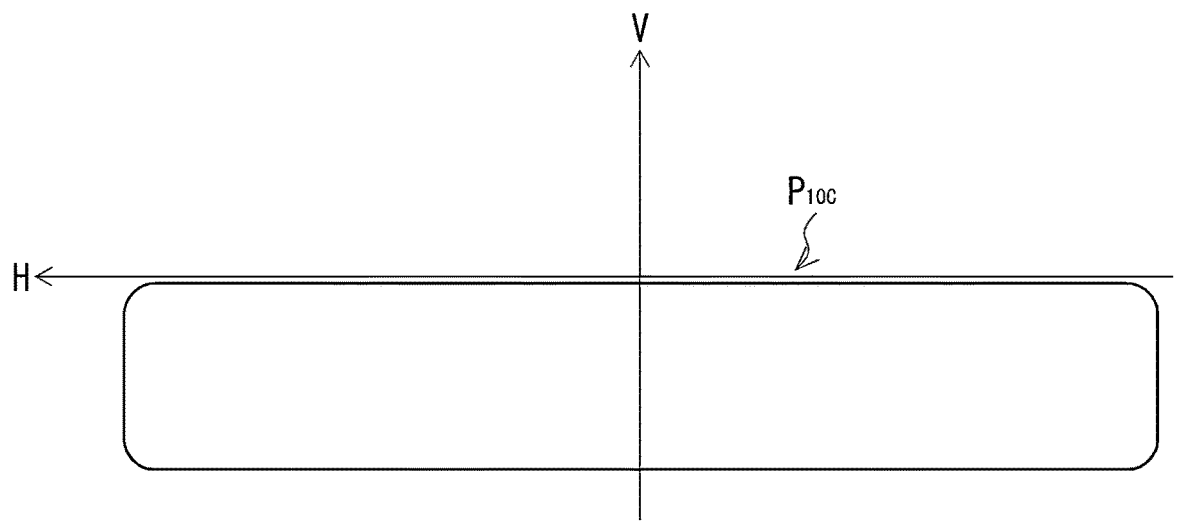
FIG. 2C shows an example of a wide light distribution pattern $P_{10C}$ formed by a lamp unit 10C1 for wide light distribution.
Figure 2D:
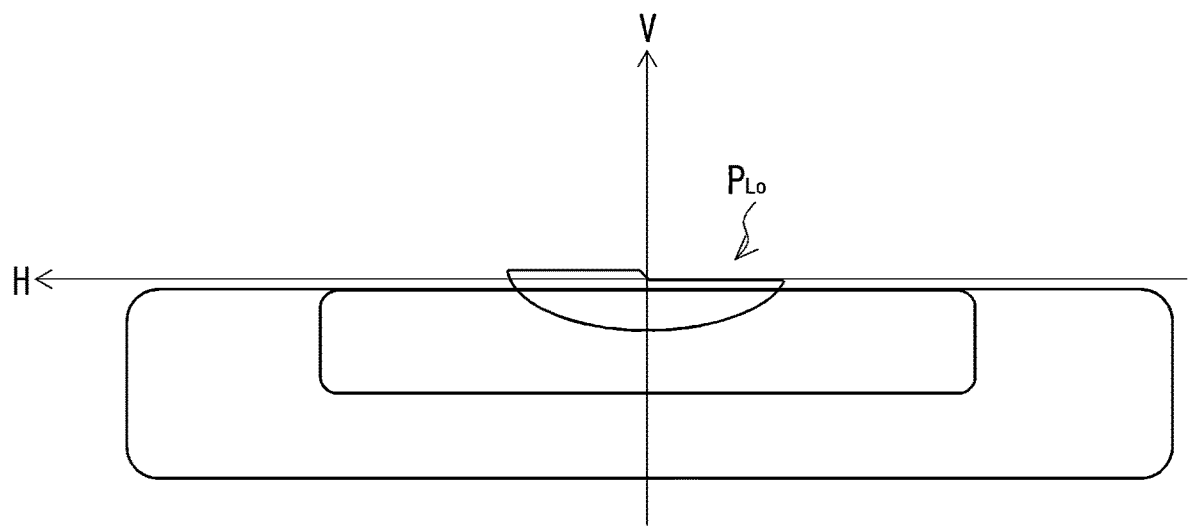
FIG. 2D shows an example of a low-beam light distribution pattern $P_{Lo}$.

FIG. 2A shows an example of a spot light distribution pattern $P_{10A}$ formed by the lamp unit 10A for slot light distribution, FIG. 2B shows an example of a middle light distribution pattern $P_{10B}$ formed by the lamp unit 10B for middle light distribution, FIG. 2C shows an example of a wide light distribution pattern $P_{10C}$ formed by the lamp unit 10C1 for wide light distribution, and FIG. 2D shows an example of a low-beam light distribution pattern $P_{Lo}$. The respective light distribution patterns $P_{10A}$ to $P_{10C}$ and $P_{Lo}$ shown in FIGS. 2A to 2D are formed on a virtual vertical screen (arranged approximately 25 m in front of a front surface of the vehicle) which directly opposes the front surface of the vehicle. The low-beam light distribution pattern $P_{Lo}$ is formed by superimposing the spot light distribution pattern $P_{10A}$, the middle light distribution pattern $P_{10B}$, and the wide light distribution pattern $P_{10C}$ on top of each other.

Hereinafter, the lamp unit 10C1 for wide light distribution will be described.

Figure 3A:
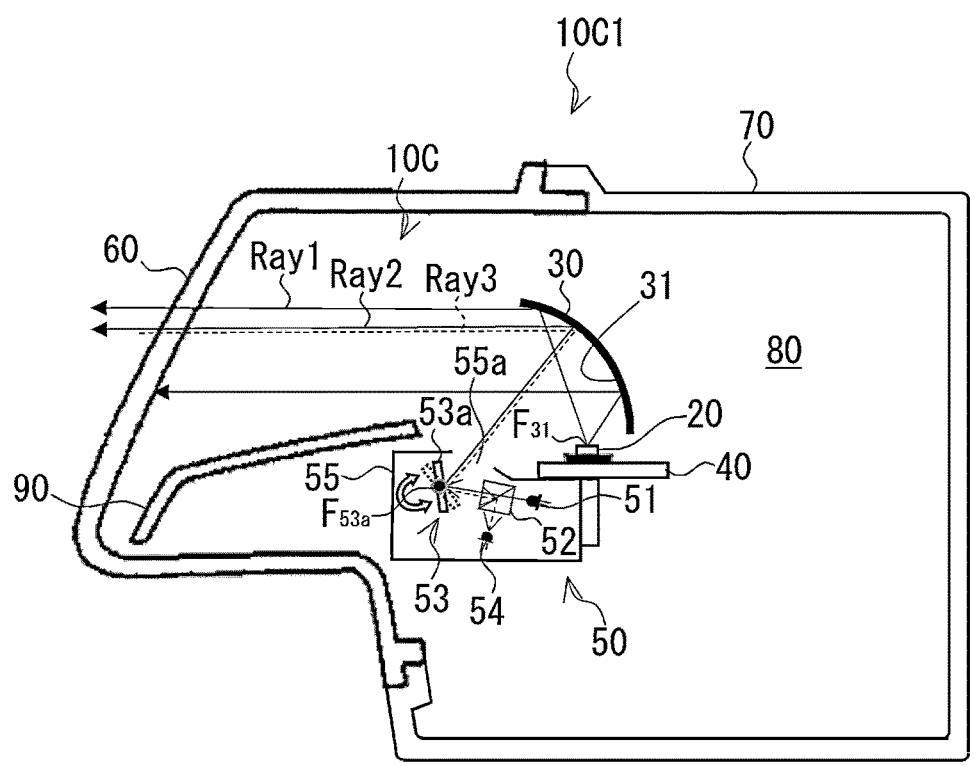
FIG. 3A is a cross sectional view (schematic diagram) taken along IIIA-IIIA in FIG. 1.
Figure 3B:
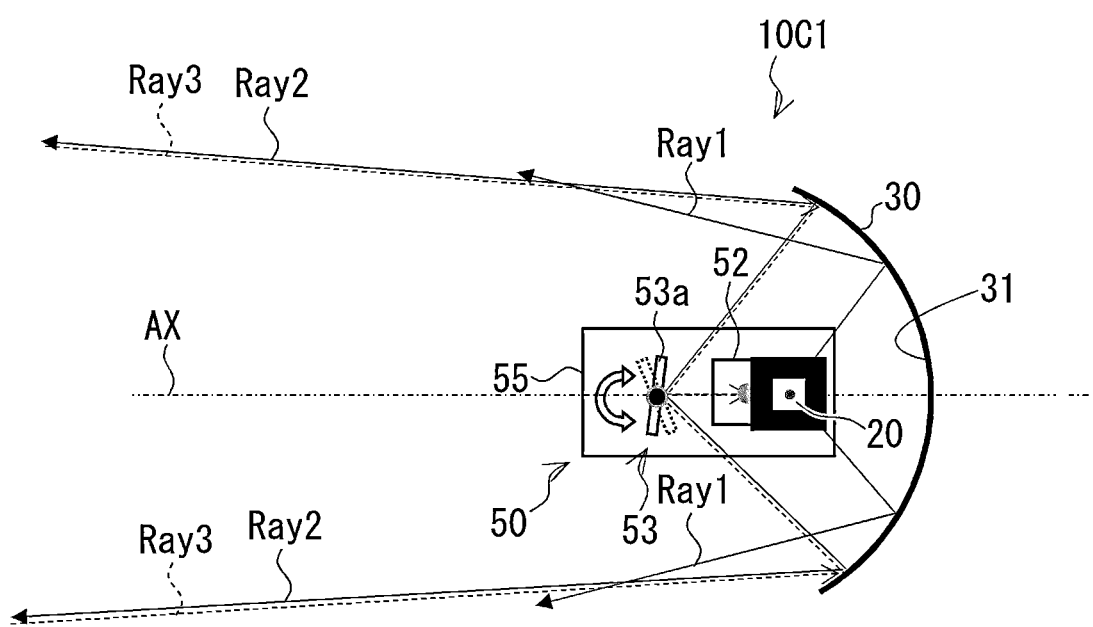
FIG. 3B is a top view (schematic diagram) of the lamp unit 10C1 for wide light distribution (an outer lens 60 and a housing 70 have been omitted).

FIG. 3A is a cross sectional view (schematic diagram) taken along IIIA-IIIA in FIG. 1, and FIG. 3B is a top view (schematic diagram) of the lamp unit 10C1 for wide light distribution (an outer lens 60 and a housing 70 have been omitted).

As shown in FIGS. 3A and 3B, the lamp unit 10C1 for wide light distribution is a lamp unit with a built-in LiDAR apparatus 50. Note that the LiDAR apparatus 50 is only built into the lamp unit 10C1 for wide light distribution and is not built into the lamp unit 10A for spot light distribution and the lamp unit 10B for middle light distribution.

The lamp unit 10C1 for wide light distribution includes a first light source 20, a reflector 30, a heat sink 40, and the LiDAR apparatus 50 (a LiDAR unit or a LiDAR module). The lamp unit 10C1 for wide light distribution is arranged inside a lamp chamber 80 constituted of the outer lens 60 and the housing 70 and is fixed to the housing 70 and the like. In FIG. 3A, reference sign 90 denotes an extension. The extension 90 is a decorative member for hiding an internal structure (the LiDAR apparatus 50 and the like) of the vehicle lamp 10 so that the internal structure cannot be visually recognized from outside.

The first light source 20 is a light source that emits visible light (for example, white light). Specifically, the first light source 20 is a semiconductor light source such as an LED mounted to a substrate. The first light source 20 includes a light-emitting surface. The light-emitting surface is, for example, a 1 mm by 1 mm square light-emitting surface. The substrate on which the first light source 20 is mounted is fixed to the heat sink 40 in a state where the light-emitting surface faces upward. Hereinafter, visible light emitted by the first light source 20 will be referred to as light Ray1.

The reflector 30 includes a reflective surface 31. The reflective surface 31 is, for example, a reflective surface of a paraboloid of revolution and is formed by subjecting a reflector base material molded by a bulk molding compound (BMC) that is a thermoset resin with aluminum vapor deposition or the like. The reflective surface 31 is a reflective surface for a wide light distribution pattern designed to reflect the light Ray1 emitted by the first light source 20 and to form the wide light distribution pattern $P_{10C}$ (refer to FIG. 2C). The wide light distribution pattern $P_{10C}$ is an example of a light distribution pattern for a vehicle lamp according to the present disclosure.

Specifically, a longitudinal cross-sectional shape of the reflective surface 31 is a substantially parabolic surface and a focal point $F_{31}$ of the reflective surface 31 is positioned in a vicinity of the first light source 20. On the other hand, a lateral cross-sectional shape of the reflective surface 31 is not a parabolic surface and is designed so that the light Ray1 reflected by the reflective surface 31 is diffused in a horizontal direction (for example, diffused in a range of 65° left to 65° right). For example, a radius of curvature of the lateral cross-sectional shape of the reflective surface 31 is designed to be greater than a radius of curvature of the longitudinal cross-sectional shape of the reflective surface 31.

Accordingly, the light Ray1 reflected by the reflective surface 31 is radiated forward as light that is mainly diffused in the horizontal direction (refer to FIG. 3B). Due to the reflective surface 31 configured as described above, the wide light distribution pattern $P_{10C}$ that is diffused in the horizontal direction (for example, diffused in a range of 65° left to 65° right) is formed as shown in FIG. 2C.

The heat sink 40 includes a base and a radiating fin. Note that the radiating fin may be omitted. The substrate mounted with the first light source 20 and the LiDAR apparatus 50 are fixed to the heat sink 40 (base).

Figure 4A:
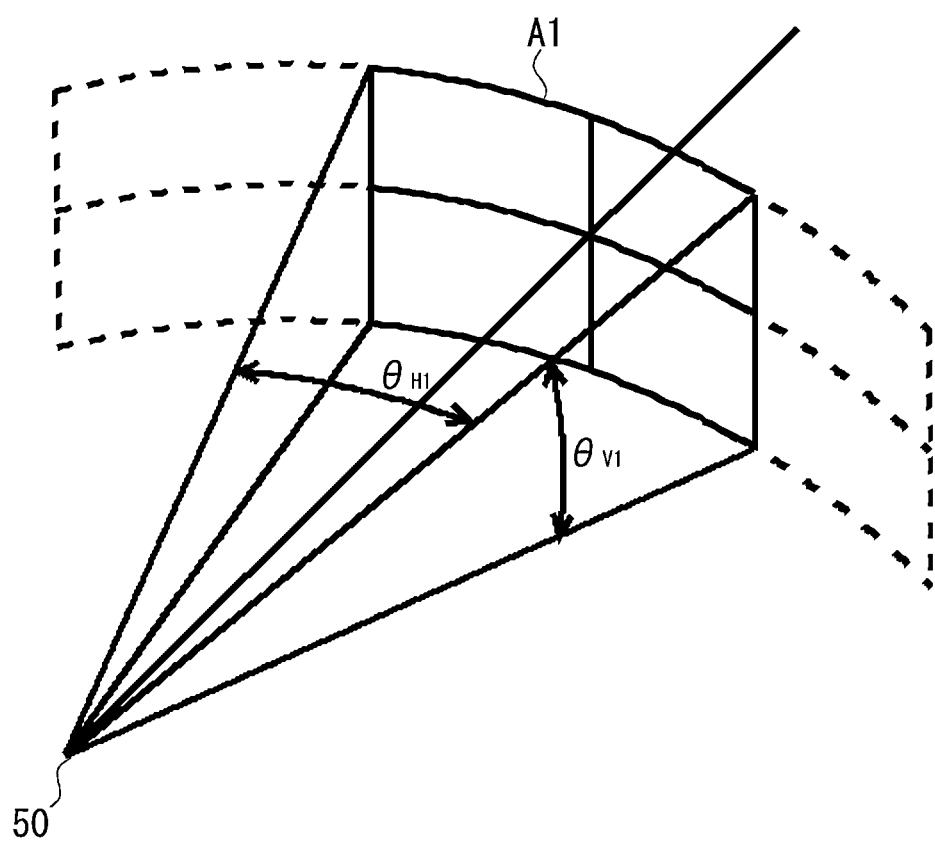
FIG. 4A shows an example of a detection range (first detection range A1) of a LiDAR apparatus 50 itself (original detection range).

The LiDAR apparatus 50 has a function of transmitting (radiating) laser light that is light for detecting an object to be detected (for example, a preceding vehicle, an oncoming vehicle, a pedestrian, a bicycle, or a motorcycle) to the first detection range A1 (an original detection range of the LiDAR apparatus 50; refer to FIG. 4A), a function of receiving return light that is reflected light of the laser light having been reflected by the object to be detected, and a function of measuring a distance to an object to be measured based on a time from transmission of the laser light until reception of the return light. As shown in FIGS. 3A and 3B, the LiDAR apparatus 50 includes a second light source 51, a beam splitter 52, an optical deflector 53 (MEMS mirror 53a), a light-receiving element 54, and a case 55 for housing these components. Note that a lens for collecting (collimating) laser light emitted by the second light source 51 may be provided between the second light source 51 and the beam splitter 52. An opening 55a through which the laser light emitted by the second light source 51 and a return light of the laser light pass through is formed in the case 55. As the LiDAR apparatus 50, for example, the LiDAR apparatus described in International Patent Publication No. WO 2020/145095 can be used.

The second light source 51 is a semiconductor light-emitting element such as a laser diode (LD) that emits laser light. The laser light emitted by the second light source 51 is an example of light for detecting an object to be detected that is transmitted (radiated) to the first detection range A1 (an original detection range of the LiDAR apparatus 50; refer to FIG. 4A) (for scanning the first detection range A1) as will be described later. Hereinafter, the laser light emitted by the second light source 51 will be referred to as laser light Ray2. In addition, return light that is reflected light of the laser light Ray2 having been reflected by the object to be detected will be referred to as return light Ray3. For example, a wavelength of light emitted from the second light source 51 ranges from 905 to 1500 nm. The second light source 51 emits the laser light Ray 2 (in pulses) under the control of a light source control unit 50a.

The laser light Ray 2 emitted by the second light source 51 is transmitted through the beam splitter 52 and incident to the optical deflector 53 (MEMS mirror 53a).

The optical deflector 53 includes the MEMS mirror 53a that reflects the laser light Ray2 so that the first detection range A1 (refer to FIG. 4A) is two-dimensionally (in the horizontal direction and the vertical direction) scanned by the laser light Ray 2. The MEMS mirror 53a is swung around two mutually orthogonal axes (for example, a horizontal axis and a vertical axis) under the control of a mirror control unit 50b (to be described later) so that the first detection range A1 (refer to FIG. 4A) is two-dimensionally (in the horizontal direction and the vertical direction) scanned by the laser light Ray 2 incident to and reflected by the MEMS mirror 53a.

Accordingly, the laser light Ray 2 emitted by the second light source 51, transmitted through the beam splitter 52, and is incident to the optical deflector 53 (MEMS mirror 53a) is transmitted (radiated) to the first detection range A1 (two-dimensionally scans the first detection range A1) (refer to FIG. 4A).

The first detection range A1 is an original detection range of the LiDAR apparatus 50 and a spread angle in the horizontal direction is $\theta_{H1}$ (field of view in the horizontal direction) and a spread angle in the vertical direction is $\theta_{V1}$ (field of view in the horizontal direction). For example, the angle $\theta_{H1}$ is 20 to 30 degrees and the angle $\theta_{V1}$ is 1 to 10 degrees. In addition, for example, a resolution in the horizontal direction is 0.5 degrees, a resolution in the perpendicular direction is 0.5 degrees, and a detection (measurement) distance is 100 to 200 m.

The return light Ray3 that is reflected light of the laser light Ray2 having been reflected by the object to be detected returns to the LiDAR apparatus 50 by traveling along a same optical path as the laser light Ray2, gets divided (reflected) on the side of the light-receiving element 54 by the beam splitter 52, and is incident to the light-receiving element 54. While the return light Ray3 is drawn as a dotted arrow that is deviated from the laser light Ray2 in order to facilitate understanding in FIGS. 3A, 3B, and the like, in reality, the optical path of the return light Ray3 and the optical path of the laser light Ray2 coincide with each other.

When the return light Ray3 that is reflected light of the laser light Ray2 having been reflected by the object to be detected is incident to the light-receiving element 54, the light-receiving element 54 outputs an electric signal in accordance with an intensity of the return light Ray3. The light-receiving element 54 is, for example, a photodiode or an SPAD (Single Photon Avalanche Diode). The electric signal outputted by the light-receiving element 54 is inputted to a signal processing unit 50c to be described later.

Figure 4B:
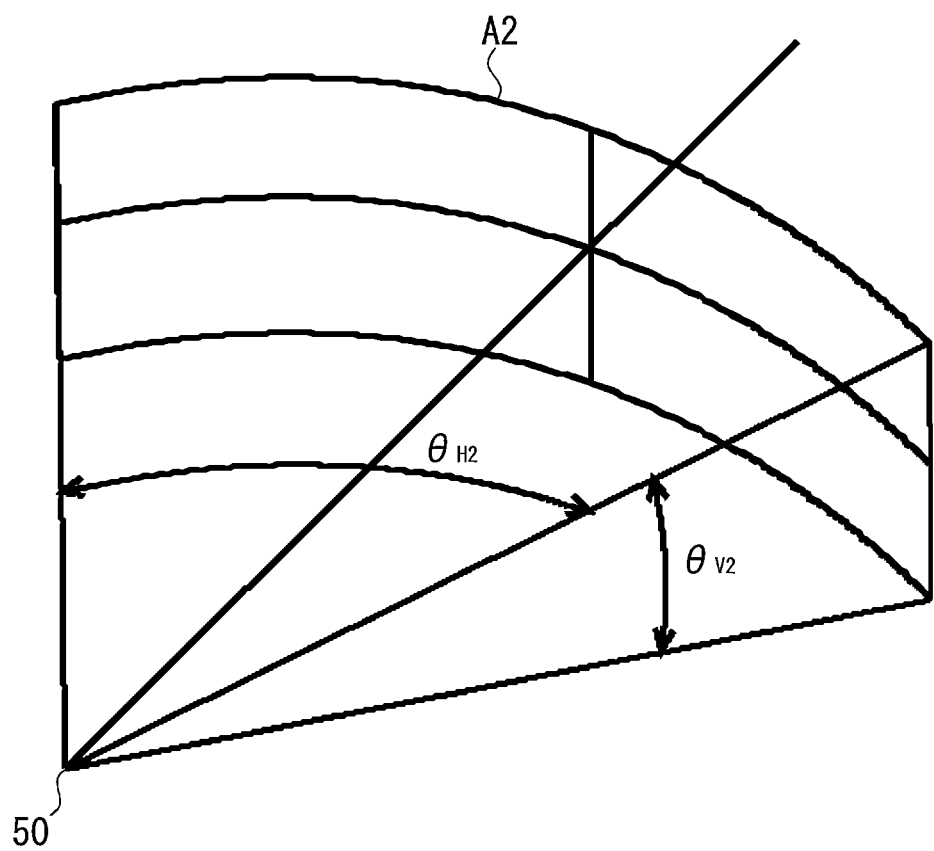
FIG. 4B shows an example of a second detection range A2 that is wider than the first detection range A1.

The LiDAR apparatus 50 (case 55) configured as described above is fixed to, for example, the heat sink 40 to which a substrate mounted with the first light source 20 is fixed in order to improve thermal dissipation. In doing so, the LiDAR apparatus 50 is arranged in consideration of a distance to the reflective surface 31, an orientation relative to the reflective surface 31, and the like so that an emission angle (in particular, an emission angle in the horizontal direction) of the laser light Ray2 emitted by the second light source 51 and reflected by the reflective surface 31 increases and the laser light Ray2 is transmitted (radiated) to the second detection range A2 (refer to FIG. 4B) that is wider than the first detection range A1 (an original detection range of the LiDAR apparatus 50; refer to FIG. 4A) (so as to two-dimensionally scan the second detection range A2).

The second detection range A2 is a range including a spread angle in the horizontal direction of $\theta_{H2}$ (field of view in the horizontal direction) and a spread angle in the vertical direction of $\theta_{V2}$ (field of view in the horizontal direction). For example, the angle $\theta_{H2}$ is 90 to 120° and the angle $\theta_{V2}$ is 1 to 10°. Note that the LiDAR apparatus 50 may be fixed to a heat sink or the like that is separate from the heat sink 40.

In the lamp unit 10C1 for wide light distribution configured as described above, due to the laser light Ray2 emitted by the second light source 51 being transmitted through the beam splitter 52, reflected by the optical deflector 53 (MEMS mirror 53a), and further reflected by the reflective surface 31, the emission angle (in particular, an emission angle in the horizontal direction) of the laser light Ray2 increases and the laser light Ray2 is transmitted (radiated) to the second detection range A2 (refer to FIG. 4B) that is wider than the first detection range A1 (an original detection range of the LiDAR apparatus 50; refer to FIG. 4A) (two-dimensionally scans the second detection range A2).

By arranging the LiDAR apparatus 50 so as to minimize a distance between a swing center $F_{53a}$ (temporary focal point) of the MEMS mirror 53a and a focal point $F_{31}$ of the reflective surface 31, the spread angle $\theta_{H2}$ in the horizontal direction (refer to FIG. 4B) can be increased. Note that the spread angle $\theta_{H2}$ in the horizontal direction (refer to FIG. 4B) can also be increased by arranging the LiDAR apparatus 50 in a state where the swing center $F_{53a}$ (temporary focal point) of the MEMS mirror 53a and the focal point $F_{31}$ of the reflective surface 31 are as far away from each other as possible so that the laser light Ray2 reflected by the reflective surface 31 and transmitted to the second detection range A2 (refer to FIG. 4B) (which two-dimensionally scans the second detection range A2) is collected in a vicinity of the lamp unit 10C1 for wide light distribution and subsequently diffused in the horizontal direction.

Next, functions of the LiDAR apparatus 50 will be described.

Figure 5:
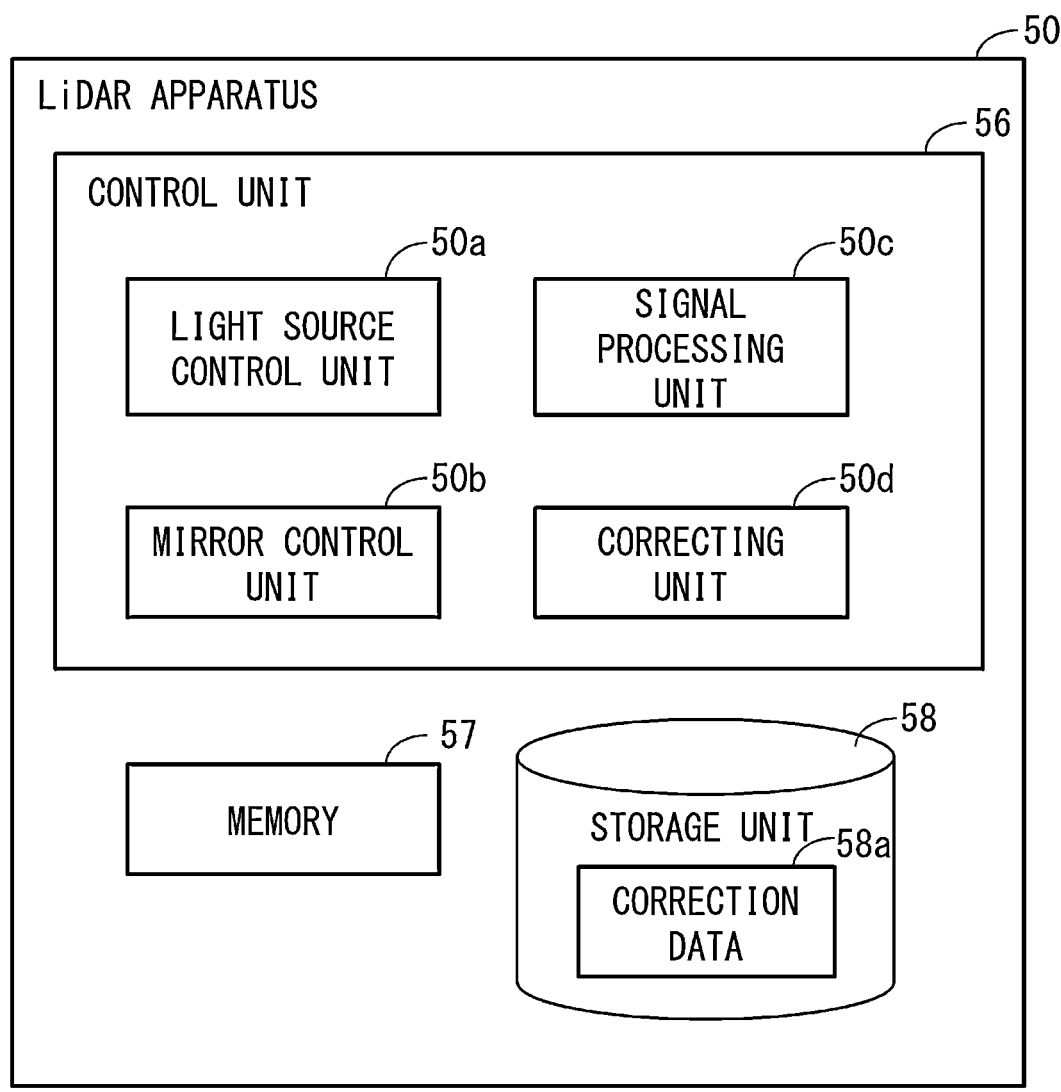
FIG. 5 is a functional block diagram of the LiDAR apparatus 50.

FIG. 5 is a functional block diagram of the LiDAR apparatus 50.

As shown in FIG. 5, the LiDAR apparatus 50 includes a control unit 56, a memory 57, and a storage unit 58. For example, the control unit 56 includes a processor (not illustrated). The processor is, for example, a CPU (Central Processing Unit). There may be one processor or a plurality of processors. By executing a predetermined program (not illustrated) loaded to the memory 57 (such as a RAM) from the non-volatile storage unit 58 that is a flash ROM or the like, the processor functions as the light source control unit 50a, the mirror control unit 50b, the signal processing unit 50c, and a correcting unit 50d. A part of or all of these functions may be realized by hardware.

The light source control unit 50a controls the second light source 51 so as to emit light in pulses.

The mirror control unit 50b controls the optical deflector 53 (MEMS mirror 53a) so that the laser light Ray2 incident to and reflected by the MEMS mirror 53a two-dimensionally (in the horizontal direction and the vertical direction) scans the first detection range A1 (an original detection range of the LiDAR apparatus 50; refer to FIG. 4A) by, for example, scanning measurement points in the first detection range A1 (for example, $N_H$-number of measurement points in the horizontal direction and $N_V$-number of measurement points in the vertical direction).

The signal processing unit 50c calculates, for each of the measurement points, a distance (a distance to the measurement point) associated with an angular direction of the object to be detected (for example, an azimuth and an elevation angle of the measurement point) based on a time from transmission of the laser light Ray2 until reception of the return light Ray3 and the like, and outputs the angular direction of the object to be detected (for example, the azimuth and the elevation angle of the measurement point) and the distance (the distance to the measurement point). After the outputted angular direction of the object to be detected (for example, the azimuth and the elevation angle of the measurement point) is corrected by the correcting unit 50d as will be described later, the angular direction is stored together with the distance (the distance to the measurement point) in the memory 57 or the storage unit 58 and used to detect the object to be detected (for example, a preceding vehicle, an oncoming vehicle, a pedestrian, a bicycle, or a motorcycle).

Based on the correction data 58a, the correcting unit 50d corrects the angular direction of the object to be detected (for example, the azimuth and the elevation angle of the measurement point) outputted by the signal processing unit 50c. The correction data 58a is stored in, for example, the storage unit 58.

A technical significance of correcting the angular direction of the object to be detected (for example, the azimuth and the elevation angle of the measurement point) is as follows. Since the laser light Ray2 that is incident to and reflected by the MEMS mirror 53a is reflected by the reflective surface 31 having been designed to form the wide light distribution pattern $P_{10C}$ (refer to FIG. 2C), the laser light Ray2 is actually transmitted not to the first detection range A1 (an original detection range of the LiDAR apparatus 50; refer to FIG. 4A) but to the second detection range A2 (refer to FIG. 4B) that is wider than the first detection range A1.

Therefore, for example, the laser light Ray2 to be transmitted in a specific angular direction (for example, an azimuth θ and a specific elevation angle) is reflected by the reflective surface 31 having been designed to form the wide light distribution pattern $P_{10C}$ (refer to FIG. 2C) and is, accordingly, actually transmitted in an angular direction (for example, an azimuth θ+Δθ and an elevation angle φ+Δφ) that differs from the specific angular direction (for example, an azimuth θ and a specific elevation angle φ).

In consideration thereof, based on the correction data, the correcting unit 50d corrects the specific angular direction (for example, the azimuth θ and the specific elevation angle φ) outputted from the signal processing unit 50c to the azimuth θ+Δθ and the elevation angle φ+Δφ. Δθ and Δφ are examples of the correction data. For example, the correction data (Δθ and Δφ) can be calculated in advance by tracking a light beam for each angular direction (for example, an azimuth and an elevation angle) using predetermined simulation software and stored in the storage unit 58.

Next, the lamp unit 10A for spot light distribution and the lamp unit 10B for middle light distribution will be briefly described.

The lamp unit 10A for spot light distribution differs from the lamp unit 10C1 for wide light distribution in that the lamp unit 10A does not include the LiDAR apparatus 50 and that the reflective surface 31 is a reflective surface for a spot light distribution pattern designed to reflect the light Ray1 emitted by the first light source 20 and to form the spot light distribution pattern $P_{10A}$ (refer to FIG. 2A). Otherwise, the lamp unit 10A for spot light distribution is configured in a similar manner to the lamp unit 10C1 for wide light distribution. Although not illustrated, the lamp unit 10A for spot light distribution is arranged inside the lamp chamber 80 constituted of the outer lens 60 and the housing 70 and is fixed to the housing 70 and the like.

In a similar manner, the lamp unit 10B for middle light distribution differs from the lamp unit 10C1 for wide light distribution in that the lamp unit 10B does not include the LiDAR apparatus 50 and that the reflective surface 31 is a reflective surface for a middle light distribution pattern designed to reflect the light Ray1 emitted by the first light source 20 and to form the middle light distribution pattern $P_{10B}$ (refer to FIG. 2B). Otherwise, the lamp unit 10B for middle light distribution is configured in a similar manner to the lamp unit 10C1 for wide light distribution. Although not illustrated, the lamp unit 10B for middle light distribution is arranged inside the lamp chamber 80 constituted of the outer lens 60 and the housing 70 and is fixed to the housing 70 and the like.

Next, an operation example of the lamp unit 10C1 (LiDAR apparatus 50) for wide light distribution will be described.

Figure 6:
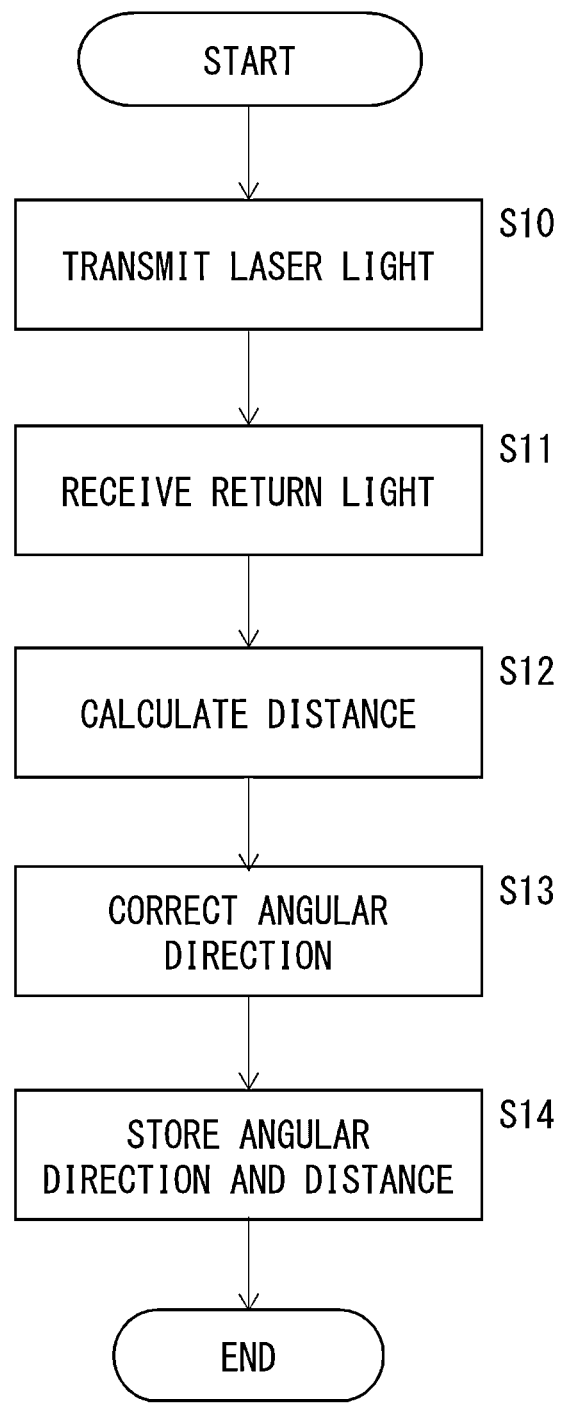
FIG. 6 is a flowchart of an operation example of the lamp unit 10C1 (LiDAR apparatus 50) for wide light distribution.

FIG. 6 is a flowchart of an operation example of the lamp unit 10C1 (LiDAR apparatus 50) for wide light distribution.

First, the laser light Ray2 is transmitted (step S10). This is realized by the light source control unit 50a controlling the second light source 51 so as to emit light in pulses. Due to the laser light Ray2 emitted by the second light source 51 being transmitted through the beam splitter 52, reflected by the optical deflector 53 (MEMS mirror 53a), and further reflected by the reflective surface 31, the emission angle (in particular, the emission angle in the horizontal direction) of the laser light Ray2 increases and the laser light Ray2 is transmitted (radiated) to the second detection range A2 (refer to FIG. 4B) that is wider than the first detection range A1 (an original detection range of the LiDAR apparatus 50; refer to FIG. 4A) (two-dimensionally scans the second detection range A2).

Next, the return light Ray3 is received (step S11). The return light Ray3 that is reflected light of the laser light Ray2 transmitted in step S10 and reflected by the object to be detected returns to the LiDAR apparatus 50 by traveling along a same optical path as the laser light Ray2, gets divided (reflected) on the side of the light-receiving element 54 by the beam splitter 52, and is incident to the light-receiving element 54. When the return light Ray3 is incident to the light-receiving element 54, the light-receiving element 54 outputs an electric signal in accordance with an intensity of the return light Ray3.

Next, the distance to the object to be detected is calculated (step S12). This is realized by the signal processing unit 50c. The signal processing unit 50c calculates, for each of the measurement points, a distance (a distance to the measurement point) associated with an angular direction of the object to be detected (for example, an azimuth and an elevation angle of the measurement point) based on a time from transmission of the laser light Ray2 until reception of the return light Ray3 and the like, and outputs the angular direction of the object to be detected (for example, the azimuth and the elevation angle of the measurement point) and the distance (the distance to the measurement point).

Next, the angular direction of the object to be detected (for example, the azimuth and the elevation angle of the measurement point) outputted by the signal processing unit 50c in step S12 is corrected (step S13). This is realized by the correcting unit 50d. Based on the correction data 58a, the correcting unit 50d corrects the angular direction of the object to be detected (for example, the azimuth and the elevation angle of the measurement point) outputted by the signal processing unit 50c in step S12.

Next, the angular direction of the object to be detected (for example, the azimuth and the elevation angle of the measurement point) corrected in step S13 and the distance calculated in step S12 are stored in the memory 57 or the storage unit 58. The stored angular direction of the object to be detected and the distance are used to detect the object to be detected (for example, a preceding vehicle, an oncoming vehicle, a pedestrian, a bicycle, or a motorcycle).

As described above, according to the first embodiment, a vehicle lamp can be provided which does not require a dedicated reflector plate (reflective surface) for light for detecting an object to be detected transmitted from the LiDAR apparatus 50 (and return light thereof) and an installation space thereof and which can be downsized.

This is due to the fact that instead of installing a dedicated reflector plate (reflective surface) for light for detecting an object to be detected transmitted from a LiDAR apparatus (and return light thereof) as in Patent Literature 1 described above, a reflective surface 31 included in the lamp unit 10C1 for wide light distribution (reflective surface for a wide light distribution pattern) is used as a reflective surface that reflects the laser light Ray2 that is light for detecting an object to be detected transmitted from the LiDAR apparatus 50 (and return light thereof).

In addition, according to the first embodiment, since the LiDAR apparatus 50 is arranged so that the laser light Ray2 which is emitted by the second light source 51 and which is reflected by the reflective surface 31 (the laser light Ray2 used by the MEMS mirror 53a for scanning) is transmitted to the second detection range A2 (refer to FIG. 4B) that is wider than the first detection range A1 (an original detection range of the LiDAR apparatus 50; refer to FIG. 4A), the original detection range of the LiDAR apparatus 50 (the first detection range A1) can be expanded to the second detection range A2 (in particular, expanded in the horizontal direction).

Furthermore, according to the first embodiment, since the correcting unit 50d that corrects the angular direction of the object to be detected (for example, the azimuth and the elevation angle of a measurement point) outputted by the signal processing unit 50c based on the correction data 58a is provided, the object to be detected can be appropriately detected even when the original detection range of the LiDAR apparatus 50 (the first detection range A1) is expanded to the second detection range A2 as described above.

Second Embodiment

Next, a lamp unit 10C2 for wide light distribution that represents a second embodiment of the present disclosure will be described with reference to the accompanying drawings. In the respective drawings, corresponding components will be denoted by the same reference signs and repetitive descriptions will be omitted.

Figure 7A:
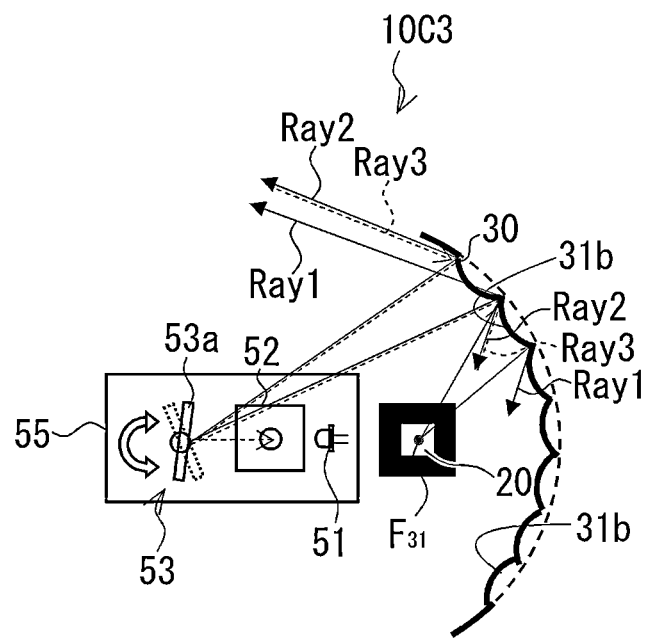
FIG. 7A is a top view of a lamp unit 10C2 for wide light distribution according to a second embodiment.
Figure 7B:
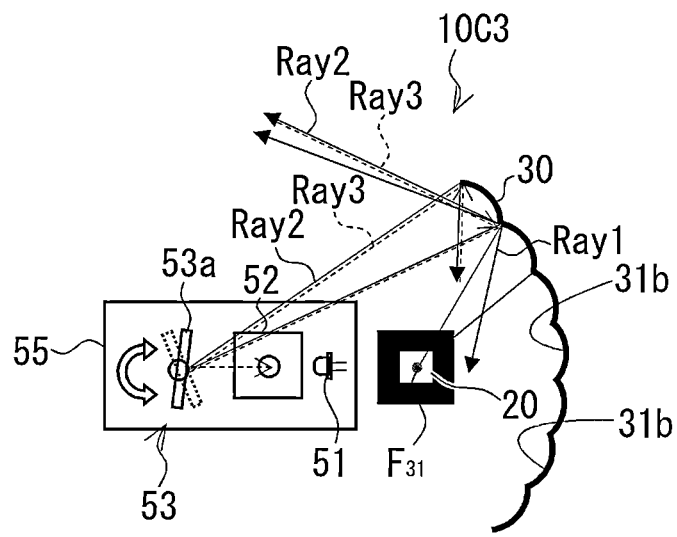
FIG. 7B is a top view of the lamp unit 10C2 (modification) for wide light distribution according to the second embodiment (the outer lens 60 and the housing 70 have been omitted).

FIG. 7A is a top view of a lamp unit 10C3 for wide light distribution according to the second embodiment, and FIG. 7B is a top view of the lamp unit 10C3 (modification) for wide light distribution according to the second embodiment (the outer lens 60 and the housing 70 have been omitted).

The lamp unit 10C2 for wide light distribution according to the second embodiment differs from the lamp unit 10C1 for wide light distribution according to the first embodiment in that the reflective surface 31 (reflective surface for a wide light distribution pattern) includes a plurality of reflection regions 31b formed by dividing the reflective surface 31 (for example, in a grid pattern). Otherwise, the lamp unit 10C2 for wide light distribution is configured in a similar manner to the lamp unit 10C1 for wide light distribution according to the first embodiment. The following description will focus on differences and similar components will be denoted by same reference signs and a description of such components will be omitted.

Each of the reflection regions 31b is designed as a convex surface (refer to FIG. 7A) or a concave surface (refer to FIG. 7B) so that the light Ray1 reflected by the reflection region 31b is diffused in the horizontal direction and forms the wide light distribution pattern $P_{10C}$ (refer to FIG. 2C) (so-called multi-reflector).

Next, a problem when forming the plurality of reflection regions 31b as described above will be described.

Figure 8A:
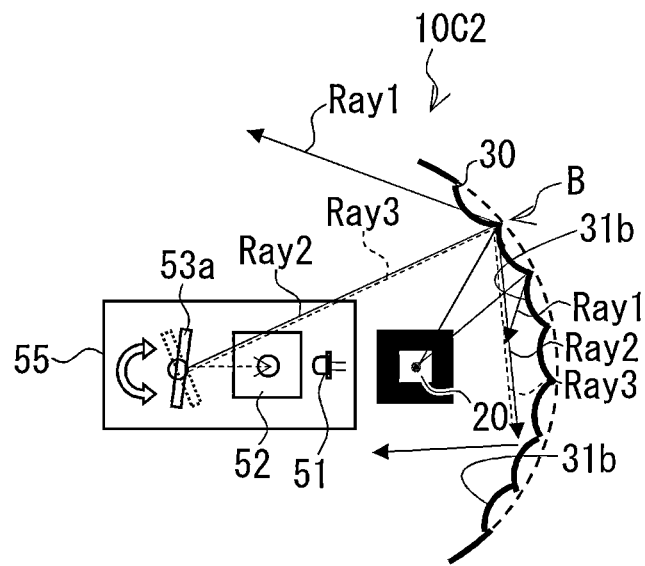
FIG. 8A is a diagram for explaining a problem when forming a plurality of reflection regions 31b.

FIG. 8A is a diagram for explaining a problem when forming the plurality of reflection regions 31b.

As shown in FIG. 8A, when forming the plurality of reflection regions 31b, there is a risk that the laser light Ray2 incident to a boundary portion B between the reflection regions 31b of the reflective surface 31 is reflected in an unintended direction (for example, by secondary reflection) in the lamp unit 10C1 for wide light distribution and, in this case, a problem that an object to be detected cannot be appropriately detected arises.

This problem can be solved by controlling the second light source 51 so that the laser light Ray2 is not transmitted in a specific angular direction (in this case, an angular direction toward the boundary portion B between the reflection regions 31b). This is realized by, for example, the light source control unit 50a controlling the second light source 51 based on light source control data or the like.

Figure 8B:
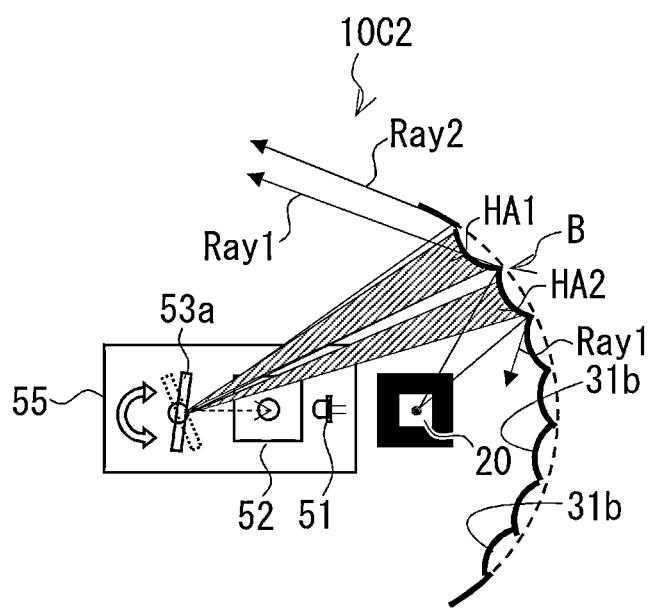
FIG. 8B is a diagram for explaining a method of solving the problem when forming the plurality of reflection regions 31b.

FIG. 8B is a diagram for explaining a method of solving the problem when forming the plurality of reflection regions 31b. In FIG. 8B, hatching areas HA1 and HA2 represent ranges in which the laser light Ray2 is transmitted and the boundary portion B (a blank area where hatching is not applied) between the hatching area HA1 and the hatching area HA2 represents a range in which the laser light Ray2 is not transmitted.

As described above, according to the second embodiment, in addition to effects similar to those by the first embodiment, the laser light Ray2 reflected by the reflective surface 31 (the boundary portion B between the reflection regions 31b) can be further prevented from being reflected in an unintended direction by controlling the second light source 51 so that the laser light Ray2 is not transmitted in a specific angular direction (an angular direction toward the boundary portion B between the reflection regions 31b).

Third Embodiment

Next, a lamp unit 10C3 for wide light distribution that represents a third embodiment of the present disclosure will be described with reference to the accompanying drawings. In the respective drawings, corresponding components will be denoted by the same reference signs and repetitive descriptions will be omitted.

Figure 9:
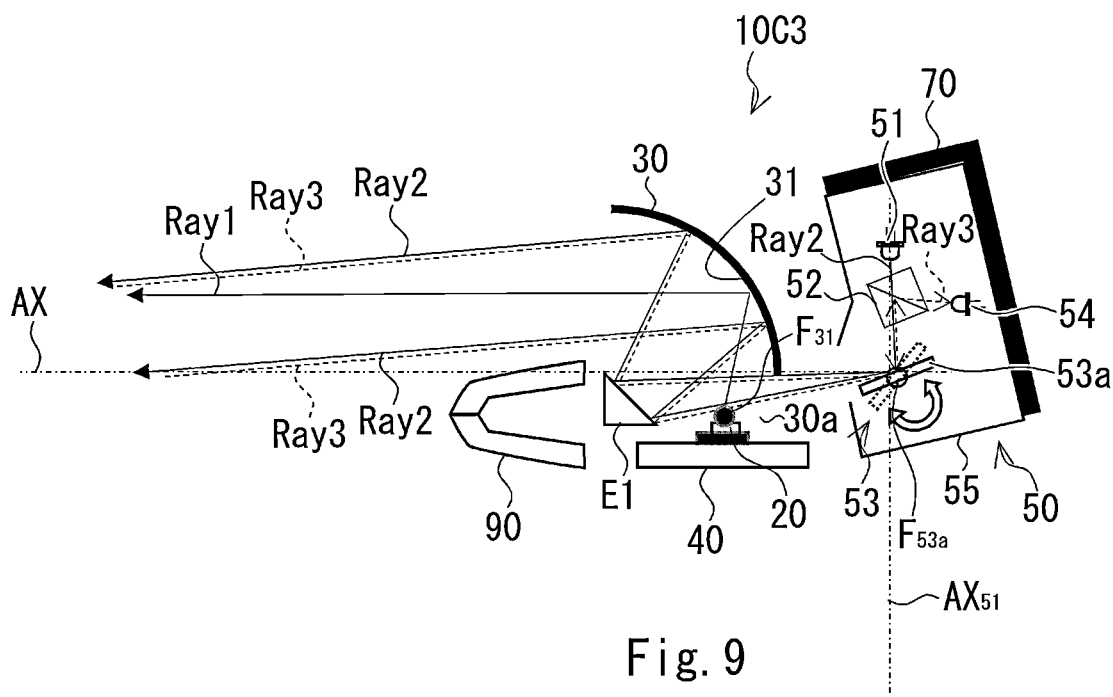
FIG. 9 is a side view of a lamp unit 10C3 for wide light distribution according to a third embodiment (the outer lens 60 and the housing 70 have been omitted).

FIG. 9 is a side view of the lamp unit 10C3 for wide light distribution according to a fourth embodiment (the outer lens 60 and the housing 70 have been omitted).

The lamp unit 10C3 for wide light distribution according to the third embodiment differs from the lamp unit 10C1 for wide light distribution according to the first embodiment in that the LiDAR apparatus 50 is arranged behind the reflector 30 (the reflective surface 31) in a state of being fixed to the housing 70. In addition, an opening 30a (or a notched portion) through which the laser light Ray2 emitted by the second light source 51 and the return light Ray3 of the laser light Ray2 pass through is formed in the reflector 30. Furthermore, a reflective member E1 that reflects, toward the reflective surface 31, the laser light Ray2 emitted by the second light source 51 is provided between the LiDAR apparatus 50 and the reflective surface 31. The reflective member E1 is, for example, a mirror or a prism. Otherwise, the lamp unit 10C3 for wide light distribution is configured in a similar manner to the lamp unit 10C1 for wide light distribution according to the first embodiment.

While a center (the swing center $F_{53a}$) of the MEMS mirror 53a is behind the focal point $F_{31}$ of the reflective surface 31, the laser light Ray2 can be adjusted to be oriented downward by inclining the center (the swing center $F_{53a}$) of the MEMS mirror 53a obliquely downward relative to a reference axis AX (optical axis). In other words, by installing the optical axis $AX_{51}$ of the second light source 51 in a vertical direction relative to the reference axis AX and adjusting the direction of the MEMS mirror 53a, an orientation of the laser light Ray2 in an up-down direction can be freely adjusted from downward to upward.

As described above, according to the third embodiment, in addition to effects similar to those by the first embodiment, since the LiDAR apparatus 50 can be arranged behind the reflector 30 (reflective surface 31), the lamp unit 10C3 for wide light distribution can be made thinner (thinner in the up-down direction shown in FIG. 9).

Fourth Embodiment

Next, a lamp unit 10C4 for wide light distribution that represents a fourth embodiment of the present disclosure will be described with reference to the accompanying drawings. In the respective drawings, corresponding components will be denoted by the same reference signs and repetitive descriptions will be omitted.

Figure 10:
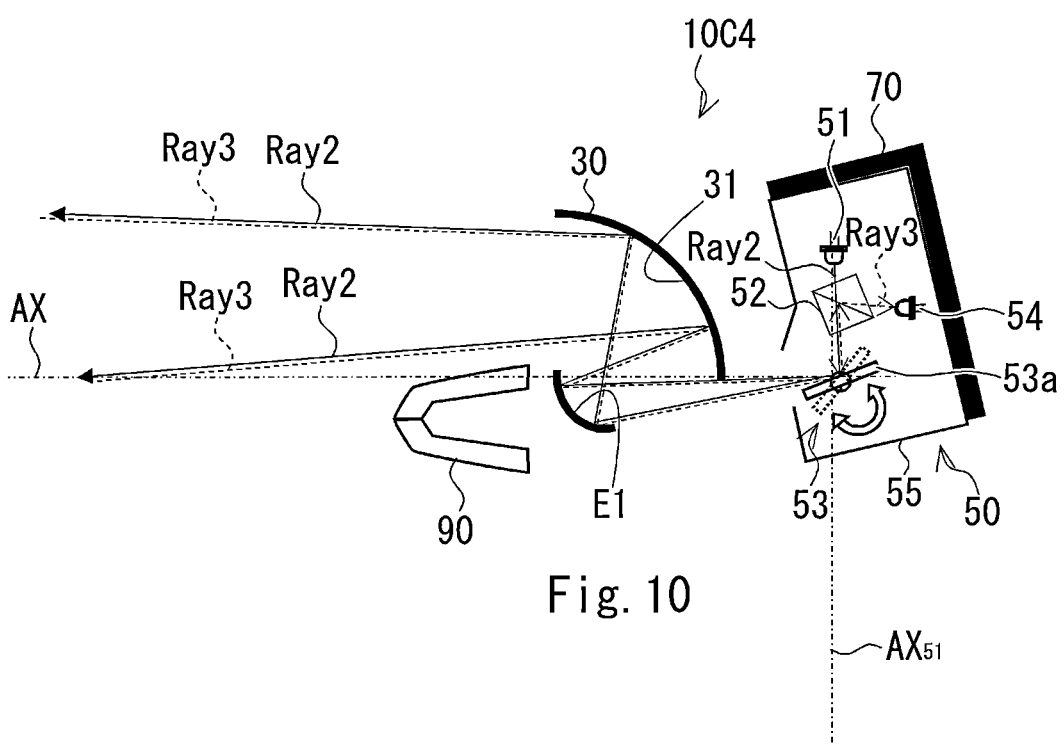
FIG. 10 is a side view of a lamp unit 10C4 for wide light distribution according to a fourth embodiment (the outer lens 60 and the housing 70 have been omitted).

FIG. 10 is a side view of the lamp unit 10C4 for wide light distribution according to the fourth embodiment (the outer lens 60 and the housing 70 have been omitted).

The lamp unit 10C4 for wide light distribution according to the fourth embodiment differs from the lamp unit 10C3 for wide light distribution according to the third embodiment in that an elliptic reflective surface (hereinafter, referred to as an elliptic reflective surface E1) is used as the reflective member E1. Accordingly, the laser light Ray2 reflected by the elliptic reflective surface E1 crosses and heads toward the reflective surface 31, gets reflected by the reflective surface 31, and is diffused in the vertical direction. Otherwise, the lamp unit 10C4 for wide light distribution is configured in a similar manner to the lamp unit 10C3 for wide light distribution according to the third embodiment.

As described above, according to the fourth embodiment, in addition to effects similar to those by the third embodiment, the laser light Ray2 can be further diffused in the vertical direction.

Next, a modification will be described.

While examples in which the vehicle lamp according to the present disclosure is applied to a vehicle lamp that functions as a low-beam head lamp have been explained in the embodiments described above, applications of the vehicle lamp according to the present disclosure are not limited thereto. For example, the vehicle lamp according to the present disclosure can be applied to a vehicle lamp that functions as a high-beam head lamp, a vehicle signal lamp, or other vehicle lamps.

In addition, while examples of using the scanning LiDAR apparatus 50 as the LiDAR apparatus have been explained in the embodiments described above, the LiDAR apparatus is not limited thereto. A flash LiDAR apparatus (not illustrated) or other LiDAR apparatuses may be used as the LiDAR apparatus.

The numerical values described in the embodiments described above are all illustrative and, naturally, appropriate numerical values that differ from the numerical values can be used.

The embodiments described above are merely illustrative in all aspects. The present disclosure is not to be taken in a limited sense according to descriptions provided in the embodiments described above. The present disclosure can be implemented in various other forms without departing from the spirit or main features of the present disclosure.

REFERENCE SIGNS LIST

10 . . . VEHICLE LAMP, 10A, 10B, 10C1 to 10C5 . . . LAMP UNIT, 20 . . . . LIGHT SOURCE, 30 . . . . REFLECTOR, 30a . . . . OPENING, 31 . . . REFLECTIVE SURFACE, 31a . . . . LiDAR APPARATUS REFLECTIVE SURFACE, 31b . . . . REFLECTION REGION, 40 . . . . HEAT SINK, 50 . . . LIDAR APPARATUS, 50a . . . . LIGHT SOURCE CONTROL UNIT, 50b . . . MIRROR CONTROL UNIT, 50c . . . . SIGNAL PROCESSING UNIT, 50d . . . . CORRECTING UNIT, 51 . . . . SEMICONDUCTOR LIGHT-EMITTING ELEMENT, 52 . . . . BEAM SPLITTER, 53 . . . . OPTICAL DEFLECTOR, 53a . . . . MEMS MIRROR, 54 . . . . LIGHT-RECEIVING ELEMENT, 55 . . . . CASE, 55a . . . . OPENING, 56 . . . . CONTROL UNIT, 57 . . . . MEMORY, 58 . . . . STORAGE UNIT, 58a . . . CORRECTION DATA, 60 . . . . OUTER LENS, 70 . . . . HOUSING, 80 . . . . LAMP CHAMBER, 90 . . . . EXTENSION, A1 . . . . FIRST DETECTION RANGE, A2 . . . . SECOND DETECTION RANGE, AX . . . REFERENCE AXIS, $AX_{51}$ . . . . OPTICAL AXIS, B . . . BOUNDARY PORTION, E1 . . . ELLIPTIC REFLECTIVE SURFACE (OPTICAL ELEMENT), $F_{31}$ . . . FOCAL POINT, $P_{10A}$ . . . SPOT LIGHT DISTRIBUTION PATTERN, $P_{10B}$ . . . MIDDLE LIGHT DISTRIBUTION PATTERN, $P_{10C}$ . . . WIDE LIGHT DISTRIBUTION PATTERN, $P_{LO}$ . . . LOW-BEAM LIGHT DISTRIBUTION PATTERN

The invention claimed is:

1. A vehicle lamp, comprising:
a first light source configured to emit visible light;
a reflective surface designed to reflect the visible light emitted by the first light source and form a light distribution pattern for a vehicle lamp; and
a LiDAR apparatus including a second light source configured to emit light for detecting an object to be detected to be transmitted to a first detection range and a light-receiving element configured to output, when return light being reflected light of the light for detecting the object to be detected having been reflected by the object to be detected is incident to the light-receiving element, an electric signal corresponding to an intensity of the return light, wherein
the LiDAR apparatus is arranged so that the light for detecting the object to be detected which is emitted by the second light source and which is reflected by the reflective surface is transmitted to a second detection range that is wider than the first detection range;
the reflective surface includes a plurality of reflection regions formed by dividing the reflective surface, and
each of the reflection regions is designed as a convex surface or a concave surface so as to diffuse visible light emitted by the first light source and reflected by the reflection region in the horizontal direction and to form a light distribution pattern for the vehicle lamp.

2. The vehicle lamp according to claim 1, wherein the LiDAR apparatus includes a MEMS mirror configured to reflect the light for detecting the object to be detected so that the first detection range is scanned by the light for detecting the object to be detected.

3. The vehicle lamp according to claim 1, wherein the reflective surface is a reflective surface for a wide light distribution pattern designed to reflect visible light emitted by the first light source and form a wide light distribution pattern that is diffused in a horizontal direction.

4. The vehicle lamp according to claim 1, wherein a radius of curvature of the lateral cross-sectional shape of the reflective surface is greater than a radius of curvature of the longitudinal cross-sectional shape of the reflective surface.

5. The vehicle lamp according to claim 1, further comprising:
a storage unit configured to store light source control data; and
a light source control unit configured to control the second light source based on the light source control data so that the light for detecting the object to be detected is not transmitted in a specific angular direction, wherein
the specific angular direction is an angular direction oriented toward a boundary portion between the reflection regions.

6. The vehicle lamp according to claim 1, wherein the LiDAR apparatus is arranged in front of the reflective surface.

7. The vehicle lamp according to claim 1, wherein the LiDAR apparatus is arranged behind the reflective surface.

8. The vehicle lamp according to claim 7, wherein a reflective member configured to reflect the light for detecting the object to be detected emitted by the second light source toward the reflective surface is provided between the LiDAR apparatus and the reflective surface.

9. The vehicle lamp according to claim 8, wherein the reflective member is a mirror or a prism.

10. The vehicle lamp according to claim 8, wherein the reflective member is an elliptic reflective surface, and
light reflected by the elliptic reflective surface crosses and heads toward the reflective surface.

11. The vehicle lamp according to claim 1, further comprising:
a signal processing unit configured to calculate a distance to an object to be detected based on an electric signal outputted by the light-receiving element and to output an angle of the object to be detected and the distance to the object to be detected;
a storage unit configured to store correction data; and
a correcting unit configured to correct the angle of the object to be detected outputted by the signal processing unit based on the correction data.

12. The vehicle lamp according to claim 1, wherein
the vehicle lamp further having a reflective surface in which a longitudinal cross-sectional shape is a substantially parabolic surface having its focal point positioned in the vicinity of the first light source, and a radius of curvature of a lateral cross-sectional shape is greater than a radius of curvature of the longitudinal cross-sectional shape.

13. The vehicle lamp according to claim 1, wherein
the vehicle lamp comprising:
a lamp unit for wide light distribution that functions as a low-beam headlamp; and
another lamp unit configured to project a spot light distribution pattern that is superimposed on the light distribution pattern projected by the wide light distribution lamp unit and that is smaller than the light distribution pattern projected by the wide light distribution lamp unit; wherein
the wide light distribution lamp unit includes the first light source, the reflective surface, the second light source, and the LiDAR apparatus.

14. The vehicle lamp according to claim 13, wherein the wide light distribution lamp unit further includes an extension configured to cover the LiDAR apparatus and prevent the LiDAR apparatus from being visually recognized from the outside.

15. The vehicle lamp according to claim 1, wherein
the plurality of reflection regions are formed by dividing the reflective surface in a grid pattern.

* * * * *